United States Patent Office 2,751,532
Patented June 19, 1956

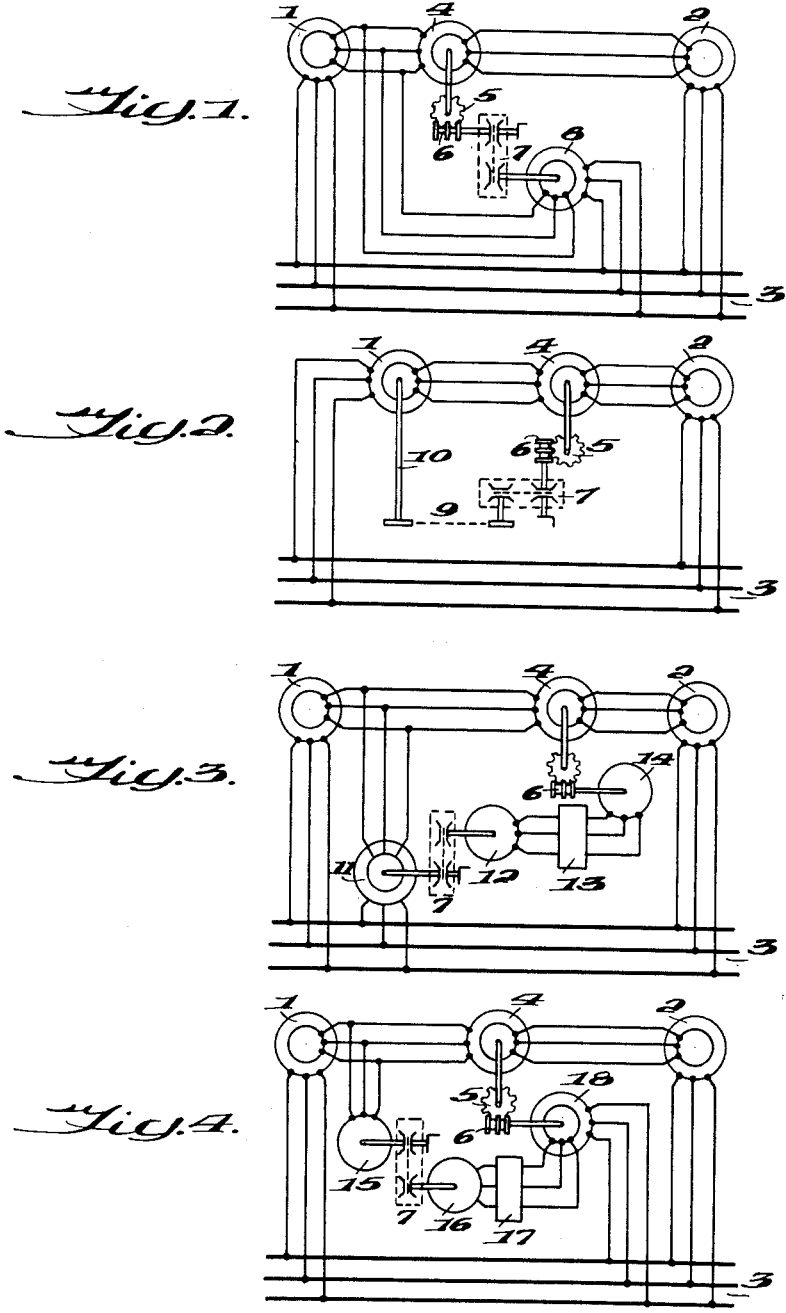

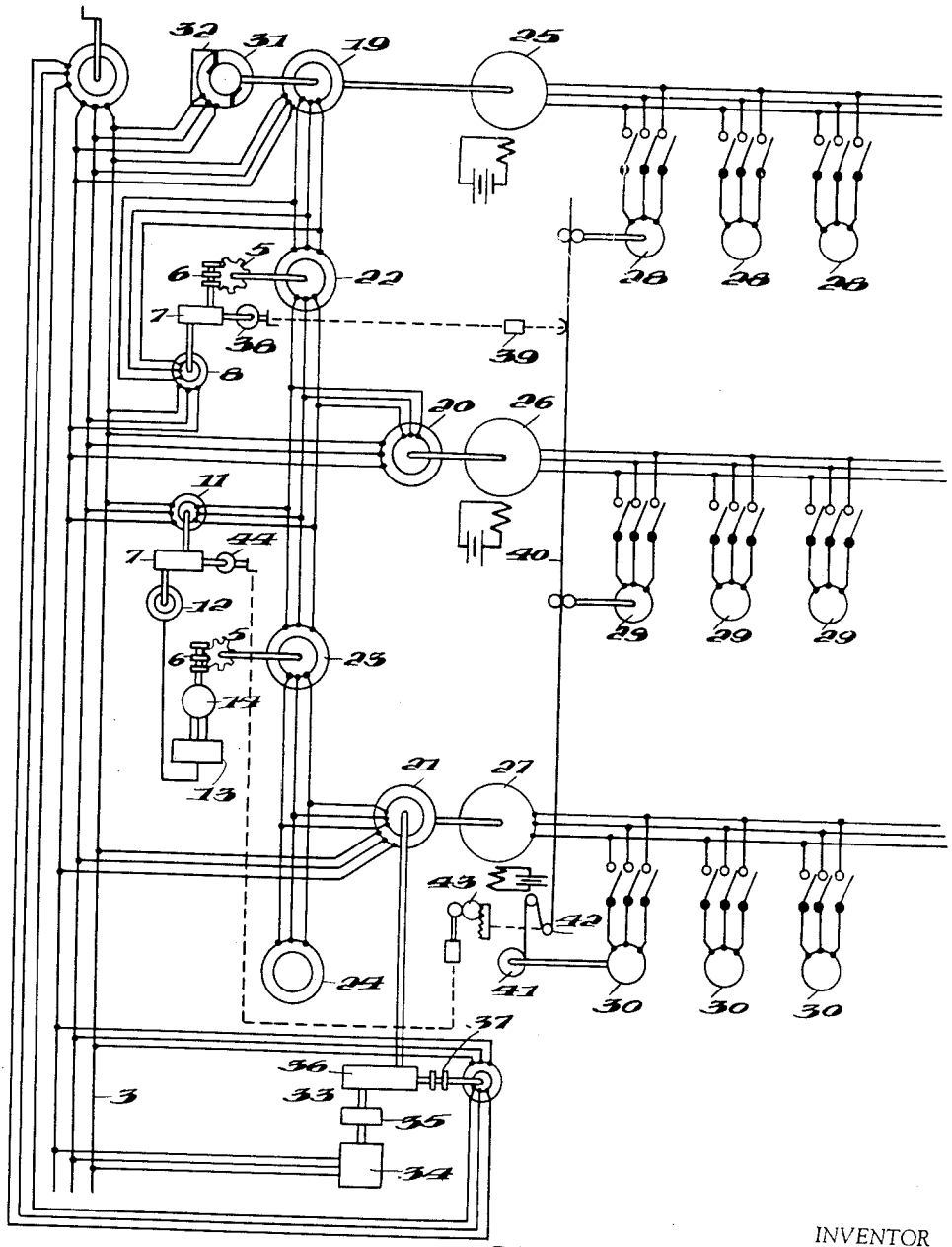

2,751,532

RELATIVE SPEED CONTROL OF PLURAL MOTORS ESPECIALLY FOR TENSION CONTROL

André Benoît de la Bretonière, Arnhem, Netherlands, assignor to American Enka Corporation, Enka, N. C., a corporation of Delaware Application June 25, 1953, Serial No. 364,065

Claims priority, application Netherlands June 30, 1952

4 Claims. (Cl. 318—7)

The invention relates to an improvement of a device for regulating the speeds of rotating bodies, and to members driven by means of rotating bodies with the aid of section motors, the speeds of which are dependent upon electric differentials in series connection such electric differentials may comprise a plurality of asynchronous polyphase motors with slip-ring armature, the rotors of which are independently driven in accordance with the desired speed of the section motors, which may comprise asynchronous polyphase motors with slip-ring armature, the stators of which are connected with the polyphase mains, and the rotors of which are interconnected via the electric differentials.

The present invention may be considered an improvement over the type of speed control system disclosed in U. S. Patent No. 2,169,016, which issued to Rest R. Baker on August 8, 1939, and which teaches the use of a plurality of wound rotor induction motors in an automatic tensioning system. More particularly, the invention utilizes the principles of conventional wound rotor induction motor systems to cause the motors of an automatic tensioning control system to run in a fixed speed relationship to each other.

The principles governing such systems are known in the art and are commonly referred to in the literature. For example, such a variable speed system is illustrated on page 190 in Figure 11.8 of the text "Synchros Self-Synchronous Devices and Electrical Servo-Mechanisms," by Leonard R. Crow, published in 1953 by the Scientific Book Publishing Co. of Vincennes, Indiana.

There, a pair of wound rotor induction motors are operated as so-called power synchros to supply load torques. A wound rotor induction motor, referred to as a differential, is electrically interconnected between the power synchros as in the present invention. The stator leads from the differential unit are connected to the rotor of one of the power synchros; the rotor output of the other power synchro is applied to the wound rotor of the differential unit, and means are provided for mechanically driving or rotating the differential rotor. The speed difference between the rotors of the power synchros is controlled by varying the speed of rotation of the differential rotor. The present invention contemplates a modification of the circuits shown schematically in the above cited references. The advantages and versatility of the modified embodiments will become apparent as the detailed description progresses. The independent drive of these electric differentials, in accordance with the desired speed of the section motors, is effected via a unilaterally working transmission mechanism. This drive is similar to that disclosed in my copending United States application Ser. No. 300,035, filed July 21, 1952.

In this latter mentioned application a description is given of the unilaterally working transmission mechanism driven by an apparatus, the speed of which is influenced by the material, on which the driven member has some effect. More particularly, there is described therein a unidirectional transmission through which the independent drive of the rotors of frequency converters may be effected, the speeds of these rotors being variable in accordance with a variation of one or more of the properties of the material which is conveyed or otherwise acted upon by the main driving motors as for instance, its tension, temperature, or other property.

The present invention aims at obtaining a device, with which any continuously adjustable ratio in speeds of the section motors may be acquired, which ratio can be maintained unchanged under any operating conditions. More particularly, the present invention contemplates a device consisting of a number of sections, by means of which any continuously adjustable ratio in speeds of the motors driving a section of the device, herein designated section motors, may be acquired, which ratio can be maintained unchanged under any operating condition.

The continuous adjustment of the ratio of speeds may be done both manually and by means of a control mechanism. This is achieved by the invention, in that the unilaterally working transmission mechanism is provided with a drive driven at a speed which is derived from the motor of the preceding section of the device.

According to the invention, the drive of the unilaterally working transmission mechanism is preferably so effected as to allow continuous adjustment. In consequence, the ratio of speeds of the various section motors may be adjusted to any desired value.

This, according to the invention, may be achieved in a simple way by employing, for the adjustment of the drive of the unilaterally working transmission mechanism, a mechanical non-slip variator. The term non-slip mechanical variator as used herein may comprise a continuously variable belt drive device adapted to function without slipping. A commercial example of such a device would include pairs of expandable conical pulleys slidably keyed on a spindle with the conical surfaces facing each other, and mounted on a yoke which is adjustable to differentially expand and contract the pulleys. The pulleys may be interconnected by means of a special belt consisting of links which are slidable with respect to each other.

According to the invention, the mechanic variator may drive a synchronous generator, which excites an energy amplifier, feeding a synchronous motor, which drives the unilaterally working transmission mechanism. The resulting advantage is that the mechanic variator may be made small, and may operate on an energy level of the order of, e. g. 1 watt, so that there is practically no slip.

In order to make the energy amplifier as small as possible, and, in addition, to manage with a smallest possible mechanical variator and synchronous generator, the construction according to the invention may be so carried out that the mechanic variator drives a synchronous generator connected with an energy amplifier which is electrically connected to the rotor of a polyphase slip-ring armature motor, the stator of which is connected to the feeding mains.

The invention is further described below, with reference to the accompanying drawings, representing, by way of illustration, wiring diagrams of some embodiments of the device according to the invention.

Figure 1 shows diagrammatically part of a device, whereby the unilaterally working transmission mechanism is driven by means of a mechanical variator;

Figure 2 shows a similar device, whereby the mechanical variator is driven by the shaft of the preceding section motor;

Figures 3 and 4 show two different embodiments; and

Figure 5 shows an example of an application of the device according to the invention.

In the various figures, the corresponding parts are indicated by the same reference numbers.

In the device shown in Figure 1, two section motors 1 and 2 are given, both consisting of asynchronous polyphase motors with slip-ring armature, the stators of which are connected to the mains 3. Between these section motors, an asynchronous motor 4 with a slip-ring armature is connected, which serves as electric differential. It will be obvious that the electric differential comprises a form of rotating frequency-converter. To the shaft of the electric differential the worm wheel 5 with a worm 6 is coupled, and this worm gear serves as a unilaterally acting transmission mechanism. The worm 6 is coupled to a non-slip mechanical variator 7, driven by an asynchronous polyphase motor 8 of which the stator is connected to the mains 3 and the rotor to the line connecting the rotor of the section motor 1 and the stator of the electric differential or frequency converter 4.

The device works as follows:

On switching in the device, the section motors 1 and 2, together with the motor 8 and consequently the electric differentials which, after disconnection, have obtained a random position, now obtain their correct position with respect to each other. On starting the machine to be driven, the speeds of all driven shafts will synchronously increase up to the respective nominal values.

In the following it is assumed that: $n$=the speed of the section motor 1; $n$=the speed of the polyphase motor 8 if provided with the same number of poles as the section motor 1; and $n'$=the speed of the differential or frequency converter 4.

The speed of the differential 4 is reduced at a predetermined ratio by adjustment of the variator 7. This reduction depends on the permanent reduction of the unilaterally acting transmission mechanism 5, 6 (let it be K) and also on the transmission ratio of the variator 7 (let this be $r$). If $r$ equal to 1 (i. e., the variator is in its center position), the speed $n'$ of the differential 4 is equal to $n/K$. The speed of 2 is then $n+n/K=n(1+1/K)$. When the range of the variator is 1:25, the maximum speed of the section motor 2 is equal to $n(1+\sqrt{25}/K)$, and the minimum speed to $n(1+1/K\sqrt{25})$. When, for instance, the speed of the section motor 1 is 1200 R. P. M., and the reduction $K=30$, the highest regulable speed of the section motor 2 is 1200 $(1+\sqrt{25}/30)=1400$ R. P. M., and the lowest is 1200 $(1+\frac{1}{30}\sqrt{25})=1208$ R. P. M.

The embodiment according to Figure 2 differs from that according to Figure 1 in that the non-slip mechanical variator 7 is coupled, instead of by the motor 8, via a mechanic transmission 9 to the shaft 10 of the preceding section motor 1. For the rest, this device functions in the same manner as does the device according to Figure 1.

In the embodiment according to Figure 3, the mechanical variator 7' is coupled to the shaft of an asynchronous slip-ring armature motor 11, of which the stator is connected to the mains 3, and the rotor between the rotor of the section motor 1 and the stator of the electric differential 4. The mechanic variator 7' drives a synchronous generator 12, the frequency of which being the excitation frequency of an amplifier 13. This amplifier feeds a synchronous polyphase motor 14 which drives the worm 6. Since, here, the mechanic variator 7' has small dimensions and works at a low energy level, non-slip and continuous regulation is possible between wide limits. It will be understood that the system formed by 7' and 12 may also be driven by means of small transmission motors in selsyn connection.

In the embodiment according to Figure 4, the mechanical variator 7' is driven by a synchronous motor 15. The variator drives a synchronous generator 16, which excites an amplifier 17. The amplifier 17 is connected with the rotor of a polyphase motor 18 with slip-ring armature, the stator of which is connected to the mains 3. This polyphase motor drives the worm 6 of the unilaterally acting transmission mechanism. In this embodiment, as in that according to Figure 3, regulation between wide limits is possible.

In summary, it will be seen that Figures 1, 2, 3 and 4 each comprises an improvement of the type of speed control circuit illustrated in the Baker Patent No. 2,169,016, and in the text book cited earlier in this specification. In each embodiment of the applicant's invention a wound rotor induction motor 2 maintains a preset speed ratio with respect to another wound rotor induction motor 1. In this specification, the units 1 and 2 are comparable to the so-called power-synchros mentioned in the earlier cited text by Mr. Crow.

An electrical differential unit 4, which comprises another wound rotor induction motor, is interconnected between the motors 1 and 2, and means are provided to drive the differential rotor in each case. The connection of the individual differential units in cascade, in order to provide an automatic tensioning system is discussed below in connection with Figure 5. As will be disclosed in the detailed description of that figure, the adjustment of the mechanical variators 7, which changes the speed of the differential rotors, is automatically effected by devices which sense the tension in the material 40.

Figure 5 shows an embodiment of the device according to the invention, whereby each of a number of section motors 19, 20, 21 . . . , between which electric differentials or frequency converters 22, 23, 24 . . . , are connected as described above, drives a synchronous polyphase generator 25, 26, 27. . . . Each synchronous polyphase generator serves for feeding a number of groups of asynchronous motors 28, 29, 30. . . . In the diagram, three motors of each of these groups are drawn, though it is clear that this number has been chosen arbitrarily. While the electrical differential 22 connected between section motors 19 and 20 is provided with the type of drive shown in Figure 1, and the differential 23 connected between 20 and 21 is provided with the drive shown in Figure 3, the invention is not thus limited. It is contemplated that any of the embodiments shown in Figure 1 through 4 may be employed in controlling the relative speeds of the section motors shown in Figure 5. Each asynchronous motor may be, for example, a self-starting reluctance type motor such as a squirrel cage polyphase induction motor.

The machine 19 is driven by a driving motor 31, drawn as a polyphase commutator type motor. By shifting the brushes 32, the speed of this motor may be regulated within certain limits (e. g., 1:3). Since a large number of the differential or frequency converter motors may be cross connected, it is advisable to equip one or more of the heavier loaded of these with a second main motor. More particularly, the motor 31 comprises a first of these main motors, and 34 comprises a second one, as will be explained more fully below.

The speed of the driving motor 21 is controlled by means of a set 33 of which the speed, contrary to that of the driving motor 31, is dependent on the load. The speed of the driving motor 31 should be practically independent of the load (shunt characteristic) because the device is to be adjusted to a certain speed of production. When for some reason the speed of the section motor 19 would change, the speed of the section motor 21 should change proportionally. For this purpose, it is necessary for the set driving this section motor 21 to be dependent upon the load, i. e. to have a series characteristic.

The above-mentioned set 33 consists, by way of example, of a polyphase motor 34 with a short circuit armature which drives via a hydraulic slip clutch 35 a mechanic variator 36, which, in turn, is coupled to the section motor 21. The adjusting device of the variator 36 is coupled electrically, via a slip clutch 37, with the brush setting device of driving motor 31, e. g. by means of a selsyn.

The speed of the section motor 20 is controlled by a device corresponding with that according to Figure 1. In this manner, remote control of the variator 7 by means of a servo motor 38 and a feeler 39, is possible in accordance with changes in the material 40 to be conveyed.

The speed of the section motor 21 is controlled by a device corresponding with that according to Figure 3. Since the winding bobbins 41 are directly driven by the winding motors 30, it must be made possible in contrast to the preceding regulation 38, 39 to regulate between wider limits, at least, if no use is made, as indicated in the drawing, of a bobbin drive via a surface drive roller.

For constant tension winding, of a so-called "dancer roll" 42, controlling a setting device 43 is used. This mechanism operates from the servomotor 44 of the variator 7, which servomotor in this case is naturally small.

Obviously, the variators 7 may also be adjusted manually.

It is evident that the invention is not restricted to the embodiments described above, and that these embodiments may be altered in numerous ways without shifting outside the scope of the invention.

What I claim is:

1. In a control system for regulating the relative speeds of a plurality of wound rotor polyphase induction drive motors which are connected each to a three-phase stator supply voltage; a plurality of frequency converters, each comprising a wound rotor polyphase induction motor, first conductor means interconnecting the wound rotor of one of said drive motors to the stator of one of said frequency converters, second conductor means interconnecting the wound rotor of each frequency converter to the stator of another frequency converter and to the wound rotor of one of said drive motors, individual drive means including a mechanical variator and a unilaterally-acting transmission for driving the rotor of each frequency converter at a predetermined speed.

2. A system as claimed in claim 1 wherein the drive motors revolve rollers to propel a strip of flexible material and wherein means are provided to sense the tension in said material and actuate the individual drive means for the rotors of each frequency changer in accordance therewith.

3. A system as claimed in claim 1 in which at least one individual drive means includes a synchronous generator driven by said mechanical variator, a power amplifier connected to receive an input signal from said synchronous generator, and a synchronous motor connected to receive the output of said power amplifier and supply torque to said unilaterally-acting transmission.

4. A system as claimed in claim 1 in which at least one individual drive means includes a synchronous generator driven by said mechanical variator, a power amplifier connected to receive an input signal from said synchronous generator, and a wound rotor induction motor having its rotor electrically connected to the output of said power amplifier and mechanically coupled to said unilaterally acting transmission.

References Cited in the file of this patent
UNITED STATES PATENTS 2,169,016  Baker _____ Aug. 8, 1939